(12) United States Patent
Yang

(10) Patent No.: US 8,921,504 B2
(45) Date of Patent: Dec. 30, 2014

(54) METHOD FOR REMOVING IONIC SPECIES CONTAINED IN AN AQUEOUS PHASE USING A SOL GEL COMPOSITE MATERIAL

(75) Inventor: Hanbae Yang, Wooster, OH (US)

(73) Assignee: ABS Materials Inc., Wooster, OH (US)

( * ) Notice: Subject to any disclaimer, the term of this patent is extended or adjusted under 35 U.S.C. 154(b) by 0 days.

(21) Appl. No.: 13/570,184

(22) Filed: Aug. 8, 2012

(65) Prior Publication Data

US 2013/0026093 A1 Jan. 31, 2013

Related U.S. Application Data

(63) Continuation-in-part of application No. 12/560,002, filed on Sep. 15, 2009, now Pat. No. 8,367,793, which is a continuation-in-part of application No. 11/537,944, filed on Oct. 2, 2006, now Pat. No. 7,790,830.

(60) Provisional application No. 61/521,207, filed on Aug. 8, 2011, provisional application No. 60/722,619, filed on Sep. 30, 2005.

(51) Int. Cl.

| | |
|---|---|
| *C08G 77/60* | (2006.01) |
| *C02F 1/28* | (2006.01) |
| *B01J 20/32* | (2006.01) |
| *B01J 20/02* | (2006.01) |
| *B82Y 30/00* | (2011.01) |
| *C08G 77/52* | (2006.01) |
| *B01J 20/28* | (2006.01) |
| *C02F 1/70* | (2006.01) |
| *B01J 20/10* | (2006.01) |
| *C08G 77/50* | (2006.01) |
| *C02F 101/12* | (2006.01) |
| *C02F 1/68* | (2006.01) |
| *C02F 101/10* | (2006.01) |
| *C02F 101/32* | (2006.01) |
| *C02F 101/16* | (2006.01) |
| *C02F 101/36* | (2006.01) |
| *C02F 103/00* | (2006.01) |
| *C08G 77/00* | (2006.01) |

(52) U.S. Cl.
CPC ............. *C02F 1/288* (2013.01); *B01J 20/3227* (2013.01); *B01J 20/02* (2013.01); *B82Y 30/00* (2013.01); *B01J 20/3236* (2013.01); *C08G 77/52* (2013.01); *B01J 20/28011* (2013.01); *C02F 1/705* (2013.01); *B01J 20/0225* (2013.01); *B01J 20/28047* (2013.01); *B01J 20/0244* (2013.01); *B01J 20/103* (2013.01); *B01J 20/0229* (2013.01); *C08G 77/50* (2013.01); *B01J 20/28026* (2013.01); *B01J 20/3272* (2013.01); *C02F 1/281* (2013.01); *C02F 2101/12* (2013.01); *C02F 1/681* (2013.01); *C02F 2101/105* (2013.01); *C02F 2101/32* (2013.01); *C02F 2101/163* (2013.01); *C02F 2101/36* (2013.01); *C02F 2103/001* (2013.01); *C02F 2305/08* (2013.01); *C08G 77/70* (2013.01)
USPC ............................. 528/35; 528/499; 524/588

(58) Field of Classification Search
CPC ................... C02F 2101/105; C02F 2101/101; C02F 2101/12; C02F 2101/163; C02F 1/281; B01J 20/0225; B01J 20/0244; C01J 20/0229; C07F 7/18; C08G 77/52
USPC ..................................... 528/35, 499; 524/588
See application file for complete search history.

(56) References Cited

U.S. PATENT DOCUMENTS

| | | |
|---|---|---|
| 2010/0038327 A1 | 2/2010 | Ma |
| 2010/0096334 A1 | 4/2010 | Edmiston |
| 2010/0113856 A1 | 5/2010 | Edmiston |

FOREIGN PATENT DOCUMENTS

| | | | |
|---|---|---|---|
| DE | 10152671 A1 | | 4/2003 |
| GB | 286307 | * | 9/1929 |
| WO | 2006028441 A1 | | 3/2006 |
| WO | 2011085224 A1 | | 7/2011 |

OTHER PUBLICATIONS

International Preliminary Report on Patentability for PCT Application No. PCT/US12/49982.
International Search Report and Written Opinion mailed Nov. 29, 2012 for PCT Application No. PCT/US12/049982.

* cited by examiner

*Primary Examiner* — Kuo-Liang Peng
(74) *Attorney, Agent, or Firm* — Arent Fox LLP

(57) ABSTRACT

Disclosed is a method for removing an ionic species contained in an aqueous phase. The method includes contacting an aqueous phase containing the ionic species with a sol gel-derived composite material, where the sol gel-derived composite material is a sol gel-derived composition having a porous matrix and containing a reactive metal incorporated into at least a portion of the porous matrix, under conditions sufficient to remove the ionic species contained in the aqueous phase.

25 Claims, No Drawings

METHOD FOR REMOVING IONIC SPECIES CONTAINED IN AN AQUEOUS PHASE USING A SOL GEL COMPOSITE MATERIAL

CROSS REFERENCE TO RELATED APPLICATIONS

This application claims the benefit of U.S. provisional application no. 61/521,207, filed Aug. 8, 2011 which application is herein incorporated by reference in its entirety.

STATEMENT REGARDING FEDERALLY FUNDED RESEARCH OR DEVELOPMENT

This invention was made with Government support under National Science Foundation Grant Nos. 1113260 and 1230147.

TECHNICAL FIELD

The present invention relates generally to the chemical arts. More particularly, the invention relates to a method for removing ionic species, such as nitrates, phosphates, and chlorides from an aqueous phase, such stormwater runoff.

BACKGROUND OF THE INVENTION

Stormwater runoff, including urban, industrial, and agricultural stormwater runoff, is a major component of non-point source pollution and the primary cause of combined wastewater treatment facility overflows. Excessive runoff volumes laden with ionic species, such as nutrients containing nitrate, phosphate and chloride ions, are of concern due to their persistence in the environment and toxicity to humans and ecosystems. Accordingly, there is a definite need for an improved method for reducing such pollutants in stormwater runoff.

Conventional bioretention systems that include soil filter media, such as vegetated buffers, rain gardens and constructed wetlands, are designed to treat runoff by employing filtration, deposition, adsorption and infiltration through porous media. However, it is a drawback of these systems that they have limited long-term effectiveness due to the limited treatment capacity of the soil filter media. Accordingly, there is also a definite need for a soil filter additive that improves the long term effectiveness of bioretention systems.

SUMMARY OF THE INVENTION

Now in accordance with the invention there has been discovered a method for removing ionic species contained in an aqueous phase that satisfies these and related needs. The method includes contacting an aqueous phase containing the ionic species with a sol gel composite material, where the sol gel composite material is a sol gel composition having a porous matrix and containing a reactive metal incorporated into at least a portion of the porous matrix, under conditions sufficient to remove the ionic species contained in the aqueous phase.

In some aspects, the method for removing an ionic species contained in an aqueous phase comprises contacting an aqueous phase containing an ionic species with a sol gel composite material, where the sol gel composite material comprises: a sol gel composition having a porous matrix, the sol gel composition swellable to at least 1.5 times its volume, and a reactive metal incorporated into at least a portion of said porous matrix, under conditions sufficient to remove said ionic species contained in said aqueous phase.

In some aspects, the sol gel composition is obtained from: about 0 to about 60 mol % of at least one first precursor having the formula:

$$(RO)_x(R_2)_y Si((R_1)Si(R_2)_y(OR)_x)_z \qquad (1)$$

where x is 2, 3 or 4, y is 0, 1 or 2 and z is 0 or 1, where said sum of x+y+z is 4, and where each R is independently a $C_1$ to $C_6$ alkyl, $R_1$ is an alkyl or aromatic bridging group and each $R_2$ is individually an organic group and from about 100 to about 40 mol % of at least one second precursor having the formula:

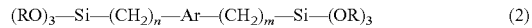
$$(RO)_3-Si-(CH_2)_n-Ar-(CH_2)_m-Si-(OR)_3 \qquad (2)$$

where n and m are individually an integer from 1 to 8, Ar is a single-, fused-, or poly-aromatic ring, and each R is independently an alkyl group as defined above and a reactive metal incorporated into at least a portion of said porous matrix, under conditions sufficient to remove said ionic species contained in said aqueous phase. In some aspects, the sol gel composition contains a plurality of alkylsiloxy substituents.

In some aspects, R is methyl or ethyl. In some aspects, each $R_2$ is independently an aliphatic or non-aliphatic hydrocarbon containing up to about 30 carbons and, in some aspects, the hydrocarbon is a straight-chain hydrocarbon, a branched-chain hydrocarbon, a cyclic hydrocarbon or an aromatic hydrocarbon.

And in some aspects, the alkylsiloxy substituents correspond to the formula:

$$-(O)_w-Si-(R_3)_{4-w} \qquad (3)$$

where $R_3$ is independently a hydrocarbon containing up to about 30 carbons and w is an integer from 1 to 3. And in some embodiments, the alkylsiloxy substituents include at least one heteroatom selected from sulfur, oxygen, nitrogen, phosphorous, halogen atom or combinations thereof.

In some aspects, the second precursor is a bis(trialkoxysilylalkyl)benzene. And is some aspects, the bis(trialkoxysilylalkyl)benzene is 1,4bis(trimethoxysilylmethyl)benzene, bis(triethoxysilylethyl)benzene or mixtures thereof. In some aspects the sol gel composition contains a plurality of alkylsiloxy substituents and is obtained from bis(triethoxysilyl)ethane.

In some aspects, the reactive metal is a catalytic metal. And in some aspects, the reactive metal is zero valent aluminum, zero valent palladium, zero valent ruthenium, zero valent iron, zero valent magnesium, zero valent nickel, zero valent zinc or combinations thereof.

In some aspects, the contacting comprises passing the phase containing an ionic species through a bioretention system comprising said sol gel composite material. And in some aspects, the bioretention system further comprises soil, sand, compost or combinations thereof

DETAILED DESCRIPTION OF THE PREFERRED EMBODIMENTS

Particular embodiments of the invention are described below in considerable detail for the purpose of illustrating its principles and operation. However, various modifications may be made, and the scope of the invention is not limited to the exemplary embodiments described below.

In accordance with the invention, there has been discovered a method for removing an ionic species contained in an aqueous phase. The method includes contacting an aqueous phase containing the ionic species with a sol gel composite material, where the sol gel composite material is a sol gel composition having a porous matrix and containing a reactive metal incorporated into at least a portion of the porous matrix, under conditions sufficient to remove the ionic species contained in the aqueous phase.

In some aspects, the sol gel composition is swellable to at least 1.5 times its volume and, in some aspects, the sol gel composition is formed from about 0 to about 60 mol % of at least one first alkoxysilane precursor having the formula:

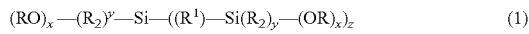

(1)

where x is 2, 3 or 4, y is 0, 1 or 2 and z is 0 or 1, where the total of x+y+z is 4, and where each R is independently hydrogen or a $C_1$ to $C_6$ alkyl, such as methyl or ethyl, $R_1$ is an alkyl or aromatic bridging group and each $R_2$ is individually an organic group and at least one second alkoxysilane precursor having the formula:

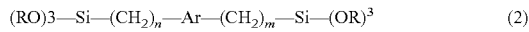

(2)

where n and m are individually an integer from 1 to 8, Ar is a single-, fused-, or poly-aromatic ring, and each R is independently an alkyl group as described above.

In some embodiments, each $R_2$ is independently an aliphatic or non-aliphatic hydrocarbon containing up to about 30 carbons, with or without one or more hetero atoms (e.g., sulfur, oxygen, nitrogen, phosphorous, and halogen atoms) or hetero atom containing moieties.

Representative $R_2$'s include straight-chain hydrocarbons, branched-chain hydrocarbons, cyclic hydrocarbons, and aromatic hydrocarbons and are unsubstituted or substituted. In some aspects, $R_2$ includes alkyl hydrocarbons, such as $C_1$-$C_3$ alkyls, and aromatic hydrocarbons, such as phenyl, and aromatic hydrocarbons substituted with heteroatom containing moieties, such —OH, —SH, —$NH_2$ and aromatic amines, such as pyridine.

Representative substituents for $R_2$ include primary amines, such as aminopropyl, secondary amines, such as bis(triethoxysilylpropyl)amine, tertiary amines, thiols, such as mercaptopropyl, isocyanates, such as isocyanopropyl, carbamates, such as propylbenzylcarbamate, alcohols, alkenes, pyridine, halogens, halogenated hydrocarbons or combinations thereof.

Exemplary first precursors include, without limitation, tetramethoxysilane, methyltrimethoxysilane, methyltriethoxysilane, phenyltrimethoxysiliane, aminopropyl-trimethoxysilane, 1,4-bis(triethoxysilyl)benzene, 2-(trimethoxysilylethyl)pyridine, bis(triethoxysilylpropyl)amine, para-trifluoromethylterafluorophenyltrimethoxysilane, (tridecafluoro-1,1,2,2-tetrahydro-octyl)trimethoxysilane, 3-aminopropyltrimethoxysilane, 3-mercaptopropyltrimethoxysilane, 3-cyanopropyltrimethoxysilane, 3-sulfoxypropyltrimethoxysilane, isocyanopropyltrimethoxysilane, 2-(3,4 -epoxycyclohexyl)ethyltrimethoxysilane, isocyanopropyltrimethoxysilane and trimethoxypropylbenzylcarbamate.

Exemplary second precursors include, without limitation, bis(trialkoxysilylalkyl)benzenes, such as 1,4-bis(trimethoxysilylmethyl)benzene (BTB), bis(triethoxysilylethyl)benzene (BTEB), and mixtures thereof, with bis(triethoxysilylethyl)benzene being preferred.

In some aspects, sol gel materials of the present invention are prepared from a reaction medium containing the alkoxysilane precursors under acid or base sol-gel conditions, preferably base sol-gel conditions, in any suitable solvent. Representative solvents for use with the base catalysts include, without limitation, tetrahydrofuran (THF), acetone, dichloromethane/THF mixtures containing at least 15% by vol. THF, and THF/acetonitrile mixtures containing at least 50% by vol. THF. Of these exemplary solvents, THF is preferred.

The amounts of first and second precursors will depend on the particular precursors and the particular application for the resulting sol gel material. The relative amounts will be readily determinable without undue experimentation. In some embodiments, the amounts vary from about 0:100 mol:mol to about 60:40 mol:mol first alkoxysilane precursor to second alkoxysilane precursor and in some embodiments from about 20:80 mol:mol to about 50:50 mol:mol first alkoxysilane precursor to second precursor.

The alkoxysilane precursors are preferably present in the reaction medium at between about 0.25M and about 1M, more preferably between about 0.4M and about 0.8M, most preferably about 0.5 M.

A catalytic solution comprising a stoichiometric amount of water and a catalyst is rapidly added to the reaction medium to catalyze the hydrolysis and condensation of the alkoxysilane precursors. Conditions for sol-gel reactions are well-known in the art and include the use of acid or base catalysts Preferred conditions are those that use a base catalyst. Exemplary base catalysts include, without limitation, tetrabutyl ammonium fluoride (TBAF), 1,5-diazabicyclo[4.3.0]non-5-ene (DBN), and alkylamines (e.g., propyl amine), of which TBAF is preferred.

As noted above, acid catalysts can be used to form swellable sol-gels, although acid catalysts are less preferred. Exemplary acid catalysts include, without limitation, any strong acid such as hydrochloric acid, phosphoric acid, sulfuric acid and the like.

After gellation, the material is preferably aged for an amount of time suitable to induce syneresis, which is the shrinkage of the gel that accompanies solvent evaporation. The aging drives off much, but not necessarily all, of the solvent. While aging times vary depending upon the catalyst and solvent used to form the gel, aging is typically carried out for about 15 minutes up to about 7 days, preferably from about 1 hour up to about 4 days. Aging is carried out at room temperature or elevated temperature (i.e., from about 18 C up to about 60 C), either in open atmosphere, under removed pressure, or in a container or oven.

Solvent and catalyst extraction (i.e., rinsing) is carried out during or after the aging process. Preferred materials for extraction include, without limitation, any organic solvent of medium polarity, including, without limitation, THF, acetone, ethanol, and acetonitrile, either alone or in combination.

After rinsing, the sol gel material is characterized by the presence of residual silanols. In some embodiments, the silanol groups are derivatized using any reagent that includes both one or more silanol-reactive groups and one or more non-reactive alkyl groups. The derivatization process results in the end-capping of the silanol-terminated polymers present within the sol-gel derivative material with alkylsiloxy groups having the formula:

(3)

where each R3 is independently an organic group as described above and w is an integer from 1 to 3.

One suitable class of derivatization reagents includes halosilane reagents that contain at least one halogen group and at least one alkyl group $R_3$, as described above. The halogen group can be any halogen, preferably Cl, Fl, I, or Br. Preferred halosilanes or dihalosilanes include, without limitation, chlorosilanes, dichlorosilanes, fluorosilanes, difluorosilanes, bromosilanes, dibromosilanes, iodosilanes, and di-iodosilanes. Exemplary halosilanes suitable for use as derivatization reagents include, without limitation, cynanopropyldimethyl-chlorosilane, phenyldimethylchlorosilane, chloromethyldimethylchlorosilane, (trideca-fluoro-1,1,2,2-tertahydro-octyl)dimethylchlorosilane, n-octyldimethylchlorosilane, and n-octadecyldimethylchlorosilane.

Another suitable class of derivatization reagents includes silazanes or disilazanes. Any silazane with at least one reactive group and at least one alkyl group $R_3$, as described above can be used. A preferred disilazane is hexamethyldisilazane.

The sol gel material is preferably rinsed in any of the rinsing agents described above, and then dried. Drying can be carried out under any suitable conditions, but preferably in an oven, e.g., for about 2 hours at about 60 C. to produce the porous, swellable, sol material.

In some aspects, the materials contain a plurality of flexibly tethered and interconnected organosiloxane particles having diameters on the nanometer scale. The organosiloxane nanoparticles form a porous matrix defined by a plurality of aromatically cross-linked organosiloxanes that create a porous structure.

And in some aspects, the resulting sol gel-derived materials are hydrophobic, resistant to absorbing water, and swellable to at least 1.5 times its volume, when dry, in acetone. Preferred sol gel-derived materials are swellable to at least two times their original volume, more preferably at least five times their original volume, most preferably up to about eight to ten times their original volume in acetone.

Without being bound by theory, it is believed that swelling is derived from the morphology of interconnected organosilica particles that are cross-linked during the gel state to yield a nanoporous material or polymeric matrix. Upon drying the gel, tensile forces are generated by capillary-induced collapse of the polymeric matrix. This stored energy can be released as the matrix relaxes to an expanded state when a sorbate disrupts the inter-particle interactions holding the dried material in the collapsed state.

In some aspects, sol gel compositions containing a plurality of alkylsiloxy substituents are obtained from at least one precursor corresponding to the formula:

$$((R_5)_3O\text{—}Si)_2\text{—}R_6 \quad (4)$$

wherein $R_5$ is methyl or ethyl and $R_6$ is a methyl, ethyl, propyl or butyl. And in some aspects the precursor the precursor is bis(triethoxysilyl)ethane.

In some aspects, such sol gel materials are prepared from a reaction medium containing bis(triethoxysilyl)ethane under base sol-gel conditions in any suitable solvent. Representative solvents for use with the base catalysts include, without limitation, tetrahydrofuran (THF), acetone, dichloromethane/THF mixtures containing at least 15% by vol. THF, and THF/acetonitrile mixtures containing at least 50% by vol. THF. Of these exemplary solvents, THF is preferred.

The alkoxysilane precursors are preferably present in the reaction medium at between about 0.25M and about 1M, more preferably between about 0.4M and about 0.8M, most preferably about 0.5 M.

A catalytic solution comprising a stoichiometric amount of water and a catalyst is rapidly added to the reaction medium to catalyze the hydrolysis and condensation of the alkoxysilane precursors. Conditions for sol-gel reactions are well-known in the art and include the use of base catalysts containing fluoride ions, such as tetrabutyl ammonium fluoride (TBAF).

After gellation, the material is preferably aged for an amount of time suitable to induce syneresis, which is the shrinkage of the gel that accompanies solvent evaporation. The aging drives off much, but not necessarily all, of the solvent. While aging times vary depending upon the catalyst and solvent used to form the gel, aging is typically carried out for about 15 minutes up to about 7 days, preferably from about 1 hour up to about 4 days. Aging is carried out at room temperature or elevated temperature (i.e., from about 18 C up to about 60 C), either in open atmosphere, under removed pressure, or in a container or oven.

Solvent and catalyst extraction (i.e., rinsing) is carried out during or after the aging process. Preferred materials for extraction include, without limitation, any organic solvent of medium polarity, including, without limitation, THF, acetone, ethanol, and acetonitrile, either alone or in combination.

After rinsing, the sol gel material is characterized by the presence of residual silanols. In some embodiments, the silanol groups are derivatized using any reagent that includes both one or more silanol-reactive groups and one or more non-reactive alkyl groups. The derivatization process results in the end-capping of the silanol-terminated polymers present within the sol-gel derivative material with alkylsiloxy groups having the formula:

$$\text{—}(O)_w\text{—}Si\text{—}(R3)4\text{-}w \quad (3)$$

where each R3 is independently an organic group as described above and x is an integer from 1 to 3.

One suitable class of derivatization reagents includes halosilane reagents that contain at least one halogen group and at least one alkyl group $R_3$, as described above. The halogen group can be any halogen, preferably Cl, Fl, I, or Br. Preferred halosilanes or dihalosilanes include, without limitation, chlorosilanes, dichlorosilanes, fluorosilanes, difluorosilanes, bromosilanes, dibromosilanes, iodosilanes, and diiodosilanes. Exemplary halosilanes suitable for use as derivatization reagents include, without limitation, cynanopropyldimethyl-chlorosilane, phenyldimethylchlorosilane, chloromethyldimethylchlorosilane, (trideca-fluoro-1,1,2,2-tertahydro-octyl)dimethylchlorosilane, n-octyldimethylchlorosilane, and n-octadecyldimethylchlorosilane.

Another suitable class of derivatization reagents includes silazanes or disilazanes. Any silazane with at least one reactive group X and at least one alkyl group R, as described above can be used. A preferred disilazane is hexamethyldisilazane.

The sol gel-derived material is preferably rinsed in any of the rinsing agents described above, and then dried. Drying can be carried out under any suitable conditions, but preferably in an oven, e.g., for about 2 hours at about 60 C to produce the porous, swellable, sol gel-derived material.

In some aspects, the resulting sol gel material is hydrophobic, resistant to absorbing water, and swellable to at least 1.5 times its volume, when dry, in acetone. In some aspects, the resulting sol gel material absorbs from about 5 to about 15 its weight and in some aspects from about 8 to about 12 its weight of acetone and other sorbates. In some aspects, the resulting sol gel material has a pore volume of from about 0.9 mL/g to about 1.1 mL/g and in some aspects, the resulting sol gel material has a surface area is 810 m2/g (from about 600m2/g to about 1200 m2/g and in some aspects from about 600m2/g to about 1200 m2/g.

In some aspects, the reactive metal is a catalytic metal and, in some aspects, the reactive metal is zero valent aluminum, zero valent iron, zero valent magnesium, zero valent nickel, zero valent zinc, zero valent palladium, zero valent ruthenium or combinations thereof. In those embodiments where the reactive metal is a zero valent iron, the zero valent iron may be used in any suitable grade, including construction or commercial grades.

The reactive metal is incorporated into at least a portion of the sol gel composition by any suitable method. In some embodiments, a particulate reactive metal is embedded or dispersed in the porous matrix of the sol gel composition. In such embodiments, the particles typically have a diameter of from about 0.1 nm to 12 nm, preferably, from about 1 nm to about 8 nm and, more preferably, from about 2 nm to about 5 nm. And in such embodiments, the amount of particulate material disposed in the porous matrix is from about 0.1% w/v to about 10% w/v, and in some embodiments from about 0.25% w/v to about 8% w/v, and, in some embodiments, from about 0.5% w/v to about 5% w/v based on the sol gel composition.

In some of these embodiments, the reactive metal is added to the trialkoxysilane precursor containing reaction mixture, prior to the sol-gel reaction. For example, from about 0.01 to about 10 parts of nano-sized reactive metal particles can be added into the reaction mixture.

The amount of reactive metal present in the sol gel composition varies based on the particular application. Factors that can influence the amount of reactive metal include the particular ionic species and/or the media (e.g., aqueous phase) containing the ionic species. The amount will be readily determinable by one skilled in the art without undue experimentation. In some aspects, the reactive metal is present in the sol gel composition from about 25% w/v to about 30% w/v.

In some aspects, the sol gel composite materials used in bioretention systems, such as raingardens and bioswales. The sol gel composite materials can be used as a filter media alone or, in some aspects, combined with a base media such as soil, sand, sand-soil-compost (SSC) and the like. In such aspects, the sol gel composite materials is combined with from about 0.05% w/v to about 5% w/v base media and in some aspects from about 0.1% w/v to about 5% w/v base media.

It is an advantage of the invention that the sol gel composite material can be used to remove a variety of ionic species present in an aqueous phase, such as stormwater runoff Representative ionic species include, without limitation, nitrates ($NO_3^-$), phosphates ($PO4^-$), and chlorides ($Cl^-$).

The ionic species are removed by contacting an aqueous phase containing the ionic species with a sol gel composite material, such as by passing stormwater containing ionic species to be removed through a bioretention system containing the sol gel composite material. Suitable conditions for contacting the aqueous phase containing an ionic species with a sol gel composite material to remove the ionic species will be readily determinable by one skilled without undue experimentation.

From the above description of the invention, those skilled in the art will perceive improvements, changes and modifications. Such improvements, changes, and modifications are within the skill of the art and are intended to be covered by the appended claims.

What is claimed is:

1. A method for removing an ionic species contained in an aqueous phase, the method comprising:
   contacting an aqueous phase containing an ionic species with a sol gel composite material, said sol gel composite material comprising,
   a sol gel composition obtained from:
   about 0 to about 60 mol % of at least one first precursor having the formula:

where x is 2, 3 or 4, y is 0, 1 or 2 and z is 0 or 1, where said sum of x+y+z is 4, and where each R is independently a $C_1$ to $C_6$ alkyl, $R_1$ is an alkyl or aromatic bridging group and each $R_2$ is individually an organic group and
   from about 100 to about 40 mol % of at least one second precursor having the formula:

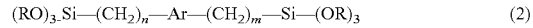

where n and m are individually an integer from 1 to 8, Ar is a single-, fused-, or poly-aromatic ring, and each R is independently an alkyl group as defined above and a reactive metal incorporated into at least a portion of said porous matrix,
   under conditions sufficient to remove said ionic species contained in said aqueous phase.

2. The method of claim 1, wherein R is methyl or ethyl.

3. The method of claim 1, wherein each $R_2$ is independently an aliphatic or non-aliphatic hydrocarbon containing up to about 30 carbons.

4. The method of claim 3, wherein said hydrocarbon is a straight-chain hydrocarbon, a branched-chain hydrocarbon, a cyclic hydrocarbon or an aromatic hydrocarbon.

5. The method of claim 1, wherein said reactive metal is a catalytic metal.

6. The method of claim 1, wherein said reactive metal is zero valent aluminum, zero valent iron, zero valent magnesium, zero valent nickel, zero valent zinc or combinations thereof.

7. The method of claim 6, wherein said catalytic metal is zero valent iron.

8. The method of claim 1, wherein said contacting comprises passing said phase containing an ionic species through a bioretention system comprising said sol gel composite material.

9. The method of claim 8, wherein said bioretention system further comprises soil, sand, compost or combinations thereof.

10. A method for removing an ionic species present in an aqueous phase, the method comprising:
    contacting an aqueous phase containing an ionic species with a sol gel composite material, said sol gel composite material comprising,
    a sol gel composition containing a plurality of alkylsiloxy substituents, said sol gel composition obtained:
    from about 0 to about 60 mol % of at least one first precursor having the formula:

where x is 2, 3 or 4, y is 0, 1 or 2 and z is 0 or 1, where said sum of x+y+z is 4, and where each R is independently a $C_1$ to $C_6$ alkyl, $R_1$ is an alkyl or aromatic bridging group and each $R_2$ is individually an organic group and
    from about 100 to about 40 mol % of at least one second first precursor having the formula:

where n and m are individually an integer from 1 to 8, Ar is a single-, fused-, or poly-aromatic ring, and each R is independently an alkyl group as defined above and a reactive metal incorporated into at least a portion of said porous matrix, under conditions sufficient to remove said ionic species contained in said aqueous phase.

11. The method of claim 10, wherein said alkylsiloxy substituents correspond to said formula:

where $R_3$ is independently a hydrocarbon containing up to about 30 carbons and w is an integer from 1 to 3.

12. The method of claim 11, wherein said alkylsiloxy substituents include at least one heteroatom selected from sulfur, oxygen, nitrogen, phosphorous, halogen atom or combinations thereof 13. The method of claim 11, wherein R is methyl or ethyl.

14. The method of claim 11, wherein each $R_2$ is independently an aliphatic or non-aliphatic hydrocarbon containing up to about 30 carbons.

15. The method of claim 14, wherein said hydrocarbon is a straight-chain hydrocarbon, a branched-chain hydrocarbon, a cyclic hydrocarbon or an aromatic hydrocarbon.

16. The method of claim 10, wherein said reactive metal is a catalytic metal.

17. The method of claim 10, wherein said reactive metal is zero valent aluminum, zero valent iron, zero valent magnesium, zero valent nickel, zero valent zinc or combinations thereof 18. The method of claim 17, wherein said reactive metal is zero valent iron.

19. The method of claim 10 wherein said second precursor is a bis(trialkoxysilylalkyl)benzene.

20. The method of claim 19 wherein said bis(trialkoxysilylalkyl)benzene is 1,4-bis(trimethoxysilylmethyl)benzene, bis(triethoxysilylethyl)benzene or mixtures thereof.

21. The method of claim 20 wherein said bis(trialkoxysilylalkyl)benzene is bis(triethoxysilylethyl)benzene.

22. The method of claim 10, wherein said contacting comprises passing said phase containing an ionic species through a bioretention system comprising said sol gel composite material.

23. The method of claim 10, wherein said bioretention system further comprises soil and, compost or combinations thereof.

24. The method of claim 1 wherein the ionic species are nitrates, phosphates or combinations thereof.

25. The method of claim 10 wherein the ionic species are nitrates, phosphates or combinations thereof.

\* \* \* \* \*